H. J. HANZLIK.
ROTARY FLUID PRESSURE MOTOR.
APPLICATION FILED NOV. 21, 1913.
1,123,527.
Patented Jan. 5, 1915.
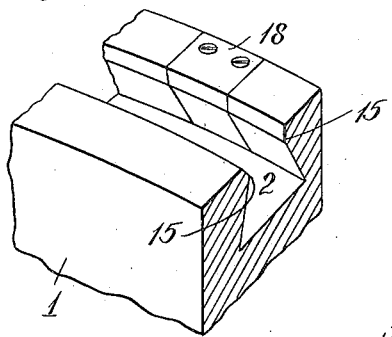
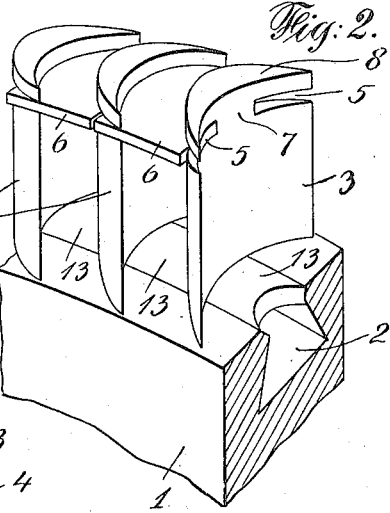
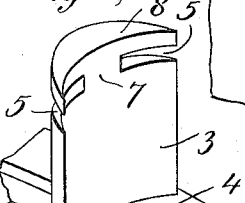
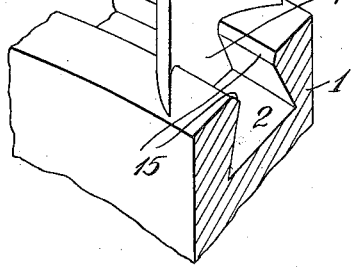
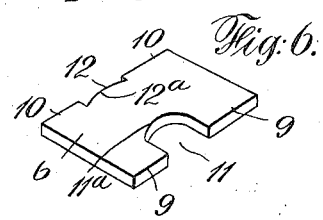
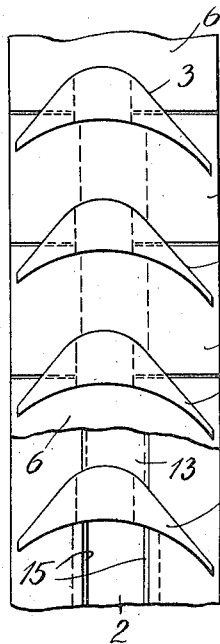
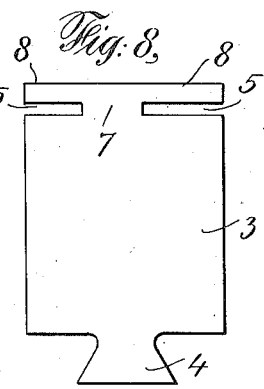
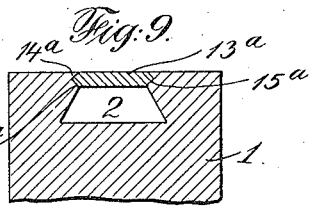
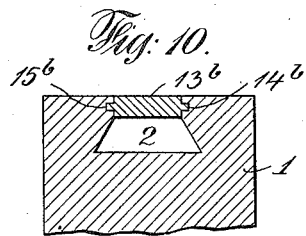
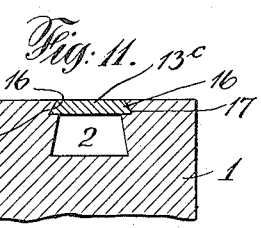
Witnesses:
Inventor

UNITED STATES PATENT OFFICE.

HENRY J. HANZLIK, OF TRENTON, NEW JERSEY, ASSIGNOR TO DE LAVAL STEAM TURBINE COMPANY, OF NEW YORK, N. Y., A CORPORATION OF NEW JERSEY.

ROTARY FLUID-PRESSURE MOTOR.

1,123,527.  Specification of Letters Patent.  Patented Jan. 5, 1915.

Application filed November 21, 1913. Serial No. 802,239.

*To all whom it may concern:*

Be it known that I, HENRY J. HANZLIK, a citizen of the United States of America, and a resident of Trenton, in the county of Mercer and State of New Jersey, have invented certain new and useful Improvements in Rotary Fluid-Pressure Motors, of which the following is a specification.

My invention relates to improvements in rotary fluid-pressure motors, particularly elastic-fluid turbines, such as steam turbines, and comprises improved means for supporting and spacing apart the buckets or blades of such turbines, and for closing the groove in the bucket support (rotor or stator) in which the bases of the buckets or blades are set.

My invention consists in the novel features hereinafter set forth, and particularly pointed out in the appended claims.

The objects of my invention are to improve the means employed for spacing apart the buckets, blades or vanes of rotary fluid-pressure motors, particularly elastic fluid turbines; to improve the means employed for closing the groove in the carrier for such buckets, blades or vanes in which the bases of such buckets, blades or vanes are customarily set; to provide spacing means and groove closing means of such construction that the same spacing means and groove-closing means are usable either with right-hand-running or left-hand-running motors; to facilitate the application of the buckets, blades or vanes to the rotors and stators of such motors, and to make the operation termed "blading" a simple and easily performed operation; to avoid occasion for the use of spacing pieces between the bases of the buckets, blades or vanes in the grooves of the supports for such buckets, blades or vanes; to insure a rigid bucket structure well adapted to withstand the excessive stresses to which such structures are subjected in the operation of such motors, and to facilitate the use of buckets, blades or vanes formed from extruded metal rods.

In the elastic fluid turbine art the terms bucket, blade and vane are applied indifferently and as substantial equivalents or synonyms to the same parts. I will hereinafter use the term bucket as applied to such parts, whether of the rotor or of the stator, and will use the term bucket-support as generic both to the support of the rotor buckets and to the support of the stator buckets.

While I have stated that my invention relates to rotary motors, I wish it to be understood that my invention is equally applicable to various forms of rotary blowers, compressors, etc.; and blowers, compressors, etc., embodying the invention herein set forth are to be regarded as within the scope of the appended claims.

In the accompanying drawings illustrating certain of the many possible structures embodying my invention Figure 1 is a fragmentary perspective elevation of a portion of a bucket carrier; Fig. 2 is a similar view showing buckets in place in that carrier; Fig. 3 is a similar view showing one bucket in place in the carrier, the groove-closing pieces and the spacing pieces not having been applied as yet; Fig. 4 shows a top view of one of the spacing pieces and Fig. 5 an end view thereof; Fig. 6 shows a perspective view of one of the spacing pieces; Fig. 7 shows a top "development" view of a bucket carrier with a series of buckets therein and with spacing pieces and groove-closing pieces applied in accordance with my invention, one of the spacing pieces having been broken away to show in top view the groove-closing piece beneath it and both spacing piece and groove-closing piece having been omitted, in front of the last bucket, to show the groove in the bucket carrier; Fig. 8 shows a front elevation of one of the buckets; Fig. 9 shows a fragmentary transverse section through the bucket carrier, and shows an alternative form of groove-closing piece in place, no bucket being shown in this view; Fig. 10 is a view similar to Fig. 9, but illustrating another alternative form of groove-closing piece, and Fig. 11 is another view similar to Fig. 9, but illustrating a further alternative form of groove-closing piece.

In steam turbines and other like elastic-fluid motors, and in certain other machines of similar type, such as certain rotary blowers and compressors employing buckets, it is necessary to support the buckets in such manner as to provide and maintain a definite space between adjacent buckets. Such buckets are commonly formed with a base of dove-tail or equivalent form fitting within a corresponding groove of the bucket carrier; and to obtain the spacing apart of the buckets it has been customary to insert space blocks within the groove of the carrier between the bases of adjacent buckets, such space blocks having their sides shaped to correspond to the curved faces of the adjacent buckets. These space blocks have proved to be very expensive to manufacture; in the case of large machines, owing to the size and shape of such blocks, and in the case of small machines owing to the extremely small size of these space blocks.

According to my present invention I space the buckets apart, not by space blocks introduced into the groove of the carrier, but by spacing pieces, one for each space between buckets, such spacing pieces being interlocked with the buckets in such manner that not only are the buckets spaced apart rigidly but also the spacing pieces are held in place firmly, and without the use of rivets or screws and without deformation of the buckets. I close the top of the groove in the bucket carrier, between the buckets, by means of small cover pieces, customarily punched from thin metal, and held in the groove of the bucket carrier without the use of screws or rivets and without staking over the edges of such groove, in such manner that such cover pieces are held firmly in place.

It is extremely desirable to be able to employ, in steam turbines and like machines, buckets formed from extruded-metal rods. By the extrusion process, now well known, bucket rods can be formed which have precisely the section desired in turbine buckets; the buckets being formed from such rods by cutting the rods to suitable lengths and forming in the pieces so obtained, by simple machining operations, the base of dove-tail or other form necessary for interlocking with the groove of the carrier, also the slots provided, in the construction herein illustrated and described, for engagement with the spacing pieces. Heretofore buckets for many types of turbines have been formed by the drop forging method; a method which requires numerous expensive dies and does not lend itself well to the production of buckets of the most desirable form. It will of course be understood that the development of high efficiency of operation in a turbine is dependent, in very large measure, on use of buckets of precisely the best theoretical form. Such form is produced more readily by the extrusion process than by any other process of which I have knowledge.

The bucket spacing means and groove closing means herein illustrated and described make the use of buckets formed from extruded metal a very simple matter, and permit the assembling of the buckets, spacing pieces, and cover pieces, on the bucket carriers, in a very simple manner, the operation termed "blading" being one which, by the present invention, can be performed by workmen of ordinary skill very expeditiously.

In the accompanying drawings 1 designates a portion of a bucket carrier (either rotor or stator) and 2 designates a dove-tail groove formed in the peripheral face of such carrier, to receive the bucket base. I do not limit myself to the use of a dove-tail groove 2; for, as is well known to those skilled in the art, bucket-retaining grooves, and bucket-bases, of various other forms, for example, of T-form, may be used, such forms being well known equivalents of the dove-tail form. But the dove-tail groove and the dove-tail bucket face are commonly used in the art, and therefore are illustrated herein.

3 designates the buckets, which, in the construction shown, are provided with dove-tail-base portions 4, corresponding to, and adapted to fit within, the groove 2 of the bucket carrier. These buckets are provided, near their outer ends, with slots 5 adapted to receive corresponding portions of the spacing pieces 6. These spacing pieces are formed from metal sheets or rods of appropriate width and thickness, and may be formed either by stamping (i. e., cutting by dies) or, where extreme accuracy is desired, by appropriate machining operations. Between the slots 5, each bucket is provided with what may be termed for convenience a "stem" 7 above which are spacer-retaining portions 8.

The spacers 6 are provided with portions 9 and 10 adapted to fit within the slots 5 and with recesses 11 and 12 adapted to embrace the sides of the stems 7, the end portions, 11ª and 12ª, of the recesses 11 and 12 respectively, being shaped to abut against the front and back faces respectively, of the stems 7. Customarily slight clearance is provided between the adjacent end portions 9 and 10 of adjacent spacing pieces. These spacing pieces, besides spacing the buckets apart, together form the equivalent of the "shroud-ring" commonly employed in certain types of turbines, and serve to prevent escape of working fluid radially.

It is desirable for various reasons to close the top of the groove 2 of the bucket carrier, between the various buckets, and for this purpose I employ thin metal cover pieces, which, as no great accuracy is required with respect to these cover pieces, may be stamped from suitable rods or sheets. One suitable form of cover piece 13 is shown in Figs. 4 and 5, the end of this cover piece corresponding generally to the profile of the portions of the adjacent buckets 3 between which it is designed to fit; and in the construction of cover piece shown in Figs. 4 and 5 such cover piece is provided at its edges with grooves 14 adapted to engage the V-edges 15 provided in the walls of the groove 2 of the bucket carrier. These cover pieces 13 are inserted when inserting the buckets, and in the same manner. In the construction shown in Fig. 9 the cover piece, there designated by numeral 13$^a$, has the edges 14$^a$ adapted to engage corresponding grooves 15$^a$ formed in the walls of the groove 2 of the bucket carrier. In the construction shown in Fig. 10, the cover piece, there designated by numeral 13$^b$, is provided at its edges with projecting ribs 14$^b$ adapted to engage corresponding grooves 15$^b$ formed in the walls of the groove 2 of the bucket carrier. The cover pieces shown in Figs. 9 and 10 are applied in the same manner as the cover piece shown in Figs. 4 and 5.

In some cases the rotors of fluid-pressure turbines are arranged to turn right handed, and in other cases are arranged to turn left handed. The spacing pieces 6 and the cover pieces 13 of the construction shown in Figs. 4, 5, 9 and 10, are adapted for use either with right hand or left hand turbines, for cover pieces and spacing pieces designed for a right hand turbine may be employed in a corresponding left hand turbine by simply turning such cover pieces and spacing pieces over, so that what is the top surface for a right hand turbine becomes the bottom surface for a left hand turbine; and vice versa. But when it is not desired that the cover pieces shall be adaptable either for right hand or for left hand turbines, the construction of cover piece shown in Fig. 11 may be employed, in which figure the cover piece is designated by numeral 13$^c$ and is provided with taper edges 16 adapted to fit within a dove-tail sub-groove 17 formed in the periphery of the bucket carrier.

It will be understood that, as usual, the rim of the bucket carrier is provided at one or more points, with a removable section 18 on one side. In assembling the buckets and associated parts on the bucket carrier, this removable section 18 is removed, and the buckets are placed one by one with their bases in the groove of the bucket carrier and are pushed along that groove to their appropriate positions, the spacing pieces 6 being inserted as the buckets are inserted, and then the cover pieces 13 or 13$^a$, or 13$^b$, or 13$^c$; after which the removable section 18 of the rim of the bucket carrier is replaced.

Preferably, the spacing pieces 6 are of such length, measured along the periphery of the structure, that these spacers must be put under greater or less compression in the assembling of the buckets and spacers. The spacers may be put under such compression readily by means well known to those skilled in the art. By putting the spacers under compression absolute tightness and rigidity of the bucket structure is assured.

I am aware that in the past, in certain forms of turbines, sectional shroud rings have been employed, each section having openings through which projecting portions of the buckets are passed, such projecting portions being then riveted over. This riveting is rather an expensive process, and during the riveting the thin edges of the buckets are usually battered and deformed and have to be trued up afterward. The buckets cannot be removed and detached from the shroud ring section without cutting away the riveted portions of the buckets, necessitating the complete replacement of all buckets so detached. According to my invention, however, each individual bucket is completely finished before it is placed in the bucket carrier, and each bucket can be removed, when such removal is desired, without mutilation of any portion of the structure.

What I claim is:—

1. The combination of a bucket-carrier, a series of buckets engaged with and carried by said carrier and slotted for engagement of spacing pieces, and a separate spacing piece for the space between each two buckets, located in such space and abutting against the front face of one bucket and the rear face of another bucket and having projecting portions engaging the slots of such two buckets, whereby such spacing piece is held in place.

2. The combination of a bucket-carrier, a series of buckets engaged with and carried by said carrier, and spacing pieces between such buckets, and engaging the same near the ends thereof, such spacing pieces being under compression.

3. The combination of a bucket-carrier, a series of buckets engaged with and carried by said carrier, and reversible spacing pieces between and spacing apart the said buckets and engaging said buckets near the outer ends thereof and interlocked directly therewith, the said spacing pieces formed for use for either right hand or left hand rotation at will.

4. The combination of a bucket-carrier, a series of buckets engaged with and carried by said carrier, said carrier having a groove and the buckets having each a base portion fitting within that groove, means for spacing the buckets apart, such spacing means being located outside of the groove, and cover pieces, for the portions of such groove intermediate the buckets, provided with engaging means adapted to engage corresponding engaging means of the bucket carrier, whereby such groove-closing pieces are retained in place.

5. The combination of a bucket carrier, a series of buckets engaged with and carried by said carrier, said carrier having a groove and the buckets each having a base portion fitting within said groove, means for spacing the buckets apart, such spacing means being located outside of the groove, and reversible cover pieces, for the portions of such groove intermediate the buckets, provided with engaging means adapted to engage corresponding engaging means of the bucket carrier, whereby such groove-closing pieces are retained in place, such groove-closing pieces being reversible for use either in right hand turning or left hand turning machines at will.

6. The combination of a bucket carrier, a series of buckets engaged with and carried by said carrier, said carrier having a groove and the buckets each having a base portion fitting within that groove, means for spacing the buckets apart, said spacing means being located outside of the groove, and cover pieces, for the portions of such groove intermediate the buckets, said cover pieces and the corresponding portions of the walls of said groove being provided, the one with projections and the other with corresponding grooves receiving such projections, whereby such groove-closing pieces are retained in place by engagement of said projections and corresponding grooves of the closing pieces and walls of the main groove of the carrier.

7. The combination of a bucket carrier, a series of buckets engaged with and carried by said carrier, and individual spacing pieces for the several spaces between the buckets, each such spacing piece abutting against the front face of one bucket and the rear face of another bucket, said buckets and the corresponding spacing pieces provided with engaging means directly interlocking the buckets and spacing pieces and permitting engagement and disengagement of the buckets and corresponding individual spacing pieces without distortion or mutilation of either the buckets or the spacing pieces.

In testimony whereof I have signed this specification in the presence of two subscribing witnesses.

HENRY J. HANZLIK.

Witnesses:
C. R. WALLER,
HARRY B. LAPP.